United States Patent

[11] 3,596,571

| [72] | Inventors | Harold T. Hill<br>Sway, Nr. Lymington;<br>John Robson, Lymington; Roger A. Day,<br>Lymington, all of, England |
|------|-----------|---|
| [21] | Appl. No. | 839,515 |
| [22] | Filed     | July 7, 1969 |
| [45] | Patented  | Aug. 3, 1971 |
| [73] | Assignee  | Wellworthy Limited<br>Lymington, England |
| [32] | Priority  | July 15, 1968 |
| [33] |           | Great Britain |
| [31] |           | 33714/68 |

[54] PISTONS
9 Claims, 9 Drawing Figs.

[52] U.S. Cl. .................................................. 92/222,
92/231, 92/260, 123/193

[51] Int. Cl. ...................................................... F02f 7/00,
F16j 1/04, F16j 1/00

[50] Field of Search............................................ 92/231,
260, 222; 123/193 P

[56] References Cited

UNITED STATES PATENTS

| 2,336,918 | 12/1943 | Aske ............................ | 123/193 |
| 2,775,493 | 12/1956 | Cheney ........................ | 123/193 |
| 3,354,793 | 11/1967 | Meier et al................... | 92/231  |

FOREIGN PATENTS

| 274,907 | 12/1928 | Italy ............................. | 92/231 |

OTHER REFERENCES

"Welding" - Simons - Copyright 1965 pages 136, 137
"Welding Handbook" - Phillips - 1967 page 90.27

*Primary Examiner*—Laurence M. Goodridge
*Assistant Examiner*—Ronald B. Cox
*Attorney*—Holcombe, Wetherill & Brisebois

ABSTRACT: This invention relates to a piston for an internal combustion engine, compressor or the like, which is composed of at least two mating parts, for example a light alloy piston body part and a wear-resistant ring groove carrier part or heat-resistant crown part, the parts being permanently assembled together by friction welding. The invention also relates to a method of making such pistons.

PISTONS

This invention relates to pistons, and to methods for their manufacture.

According to this invention, in one aspect, a piston includes two mating parts secured together by friction welding.

According to this invention, in another aspect, a method for the manufacture of a piston includes forming at least two mating parts of friction-weldable materials, holding the two parts in register one with the other, and causing relative rubbing motion between the two parts to friction weld one part to the other.

Preferably the relative rubbing motion is caused by unidirectional relative rotation of the parts.

One of the parts may be a piston body part formed from fully heat-treated aluminum or magnesium alloy, and another part may be an annular ring groove carrier part formed from a wear-resistant material. An annular passage for a coolant may be provided between the two parts.

Figure 1:
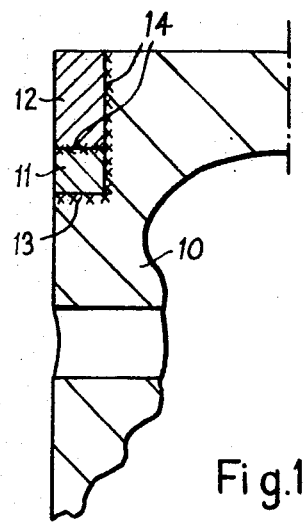
Figure 2:
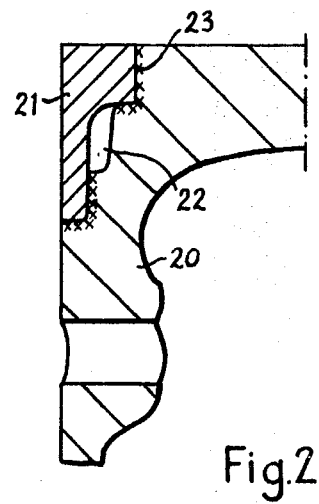

A number of embodiments of the invention will now be described by way of example with reference to the accompanying drawings, of which:

FIG. 1 illustrates a first embodiment of piston and its method of manufacture;

FIGS. 2, 3, 4, 5, 6, 7 8A and 8B illustrate respectively second, third, fourth, fifth, sixth, seventh and eighth embodiments of piston and their methods of manufacture, and a modification of the eighth embodiment.

Referring to FIG. 1, the piston illustrated is made up of a body part 10, a ring carrier part 11, and a top land ring part 12. The body part 10 may conveniently be of aluminum alloy or magnesium alloy, or of any other material which is capable of being friction welded to the other parts, and is conveniently formed by casting or forging and then machining. The top of the sidewall of the body part 10, which forms the sidewall of the finished piston, is formed with a recess, in this case an annular recess of rectangular section, to receive the other parts 11, 12.

The ring carrier part 11 may be of steel, stainless steel, bronze, hypereutectic aluminum-silicon alloy, or any other wear-resistant material which is capable of being friction-welded to the body part 10, and is machined to dimensions to fit the cooperating recess in the body part 10. The parts 10, 11 are then held in suitable chucks in register with one another, and are simultaneously relatively rotated and pressed toward one another, in a direction axially of the piston, to cause rubbing motion between the two, causing melting of one or both of the contacting surfaces. The rotation is then stopped and the parts maintained in contact, allowing the contacting surfaces to cool, and thus forming a welded joint 13 between the two parts 10, 11. A typical time during which the rubbing motion is continued is 3 seconds.

The relative rotation between the parts is unidirectional, and may be achieved by means of an electric motor fitted with a braking device for stopping rotation.

The exposed surfaces may then be cleaned up by machining, and the top land ring part 12 is friction welded to the ring carrier part 11 and to the body part 10 in the same manner as described above. This latter weld is indicated at 14. The top land ring part 12 will usually be of the same material as the body part 10, but may be of any convenient material. For example, the body part 10 may be of forged aluminum alloy and the part 12 of cast aluminum alloy. The piston is then machined or otherwise formed in known manner to produce its final contour, as well as to form one or more piston ring grooves (not shown) in the part 11 and, if required, also in the other parts.

It will be apparent that rubbing may take place between, for example, parts 10 and 11 on the plane surfaces normal to the piston axis, but not around the complete circumference of the adjoining circumferential surfaces of the parts. It has been found that when welding a ring part of aluminum alloy to a body part of the same material, good adhesion occurs between the circumferential surfaces, which is believed to be due to running of the molten weld metal from between the adjoining plane surfaces to between the adjoining circumferential surfaces. When welding dissimilar materials this effect may be less marked, and in this case, for example when welding a ferrous ring carrier part 11 to an aluminum alloy body part 10, cooperating frustoconical surfaces may be provided instead of circumferential surfaces. However, this may not be necessary, as it has been found that with a construction as shown in FIG. 1, the adhesion between the upper and lower plane surfaces of a ferrous ring carrier part 11 and the body part 10 and the top land ring part 12 respectively, both the latter being of aluminum alloy, is so good that even complete lack of adhesion between the circumferential face of the ring carrier part 11 and the body part 10 may be unimportant.

Figure 3:
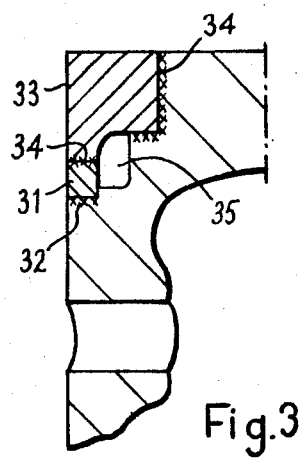

The method may also be used to form cooling cavities in the piston. In this respect, referring to FIG. 2, there is shown a piston body part 20 and a mating ring part 21, the profiles of which are so shaped as to form an annular cavity 22 within the piston. The ring part 21 is friction welded to the body part 20 by the method described above, as indicated at 23.

Where it is required to form a cavity and also to provide a ring carrier part of material different to that of the top land ring part as shown in FIG. 3, the body part 30 may be formed with a recess having three steps. The ring carrier part 31 then registers with the first step, and is friction welded to the body part at least along the radial face 32, and probably also along the adjacent circumferential face; moreover, the latter provides a positive location for the ring carrier part. The exposed surfaces are then cleaned up, and the top land ring part 33 is then friction welded to the body part 30 and to the ring carrier part 31 along the radial and circumferential faces 34. The three parts together define an annular cooling cavity 35.

Figure 4:
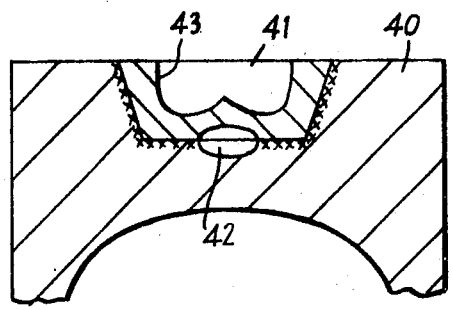

The method may also be employed to provide a piston crown part of a different material from that of the piston body. In FIG. 4 the piston body 40 is formed in the center of its upper face with a frustoconical recess, and an insert 41 is friction welded into the recess by the method described above. A cavity 42 is provided on the axis of rotation (where no relative motion occurs) which serves to receive any outflow of metal from the weld. The insert 41 may be of thermal-shock-resistant material, such as aluminum-copper-nickel-maganese alloy, sintered aluminum, copper alloy, nickel alloy, or steel. A combustion bowl 43 of any known or convenient shape may subsequently be machined in the insert 41.

Figure 5:
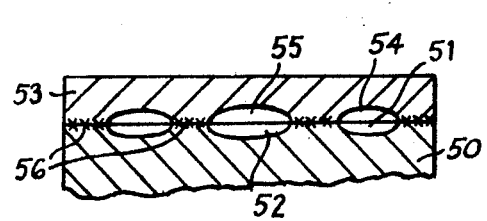
Figure 6:
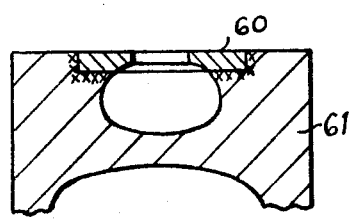

In FIG. 5, the body part 50 is formed with an annular recess 51 in its upper surface, and with a further recess 52 on the axis of rotation. A crown part 53 of the same diameter as the body part 50, formed with an annular recess 54 which registers with the recess 51, and with a central recess 55 which registers with recess 52, is friction welded to the body part, as indicated at 56. The annular recesses 51, 54 in the two parts together form an annular cooling cavity in the piston; the central recess 52, 55 allows for any outflow of weld metal, and may if desired be employed, for example, to receive cooling liquid, in which case it would be connected to the annular cooling cavity by one or more radial passages formed in the interface between the body part 50 and the crown part 53. The crown part 53 may be of heat-resistant or thermal-shock-resistant material, for example, any of the material thus exemplified above. If preferred, the cooling cavity 51, 54 may be omitted. A combustion bowl may, if desired, be machined in the crown part 53.

As shown in FIG. 5, a piston having a combustion bowl in the crown may be provided with a combustion bowl lip 60 of a heat-resisting material friction welded to a piston body 61. This arrangement may be combined with that of FIG. 4, so that the combustion bowl is defined by upper and lower heat-resistant inserts friction welded in place. The heat-resisting material may, for example, be heat-resisting austenitic steel, or nickel-base or chromium-base alloy.

In each of the embodiments described above, friction welding is achieved by relative rotation of the parts to be welded about the axis of the piston. However, where convenient, for example if an offset combustion bowl were required in the piston of FIG. 4, the rotation may be about a different axis.

Figure 7:
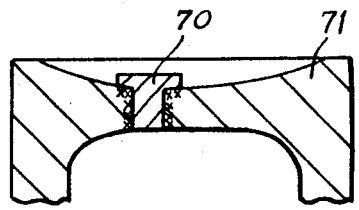

Moreover, an offset insert 70 may be provided as shown in FIG. 7, friction welded to the piston body 71, to provide a 'hot spot' on the piston crown.

Figure 8A:
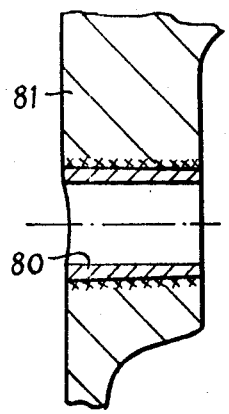
Figure 8B:
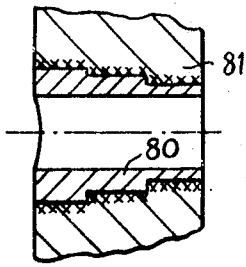

In yet another embodiment of the invention as shown in FIG. 8A a bushing 80 is friction welded in the gudgeon pin boss 81 or bosses of a piston. The bushing may be of any suitable material which may be friction welded, for example a bronze, the gudgeon pin boss being of aluminum or magnesium alloy. The outer periphery of the bushing 80 and the cooperating bore may be tapered (FIG. 8A) and/or stepped (FIG. 8B) to provide the necessary friction surfaces.

It will be appreciated that, wherever necessary, the parts to be welded will be provided with suitable lugs or projections to enable them to be held in a chuck or other holding device, the lugs or projections being machined off after welding.

It has been found that, in the manufacture of pistons by friction welding as described herein, very strong ductile welds have been formed when parts are of the same material, and improved welds have been formed between dissimilar materials as compared with those achieved by certain known welding techniques.

Moreover, with the present invention, the individual parts may be fully heat-treated (for example, the aluminum components may be solution heat-treated and then precipitation heat-treated) before welding, and only very little worsening of the physical properties occurs in the zone adjacent to the weld, as a result of the friction welding. Such heat treatment proved difficult to achieve in the past with pistons of aluminum alloy having cast-in ring carriers of wear-resistant material, because the temperature at which solution heat treatment is desirably carried out has tended to have an adverse effect on the bond between the ring carrier and the piston body.

Moreover the present invention also makes possible the production of pistons having an internal cooling cavity, the whole or the greater part of the piston being forged, as opposed to cast. This enables the grain flow to be more closely controlled, and may thus result in a stronger piston.

In the embodiments described, it will be apparent that the welds between the mating parts are formed between faces thereof. This eliminates the need to weld the parts together along lines where the mating surfaces coincide with the external surfaces of the pistons, and also eliminates the need for very small eccentricity in the assembly of the parts, and in the parts themselves.

The strength of bonds between different parts of the piston has been found by experiment to be markedly superior to that previously achieved between comparable parts.

It will be understood that various modifications may be made without departing from the scope of the present invention as defined in the appended claims. For example, the ring carrier parts illustrated in the embodiments may be dimensioned to accommodate a single piston ring groove, or any required number of grooves.

We claim:

1. A piston including: a tubular piston body part comprising a heat-treated forging or casting of light alloy, the body part including a sidewall, provided at the end thereof adjacent the crown of the piston with an annular recess; an annular mating part comprising a piston ring carrier part formed from a wear-resistant metal; and an annular top land part; the piston ring carrier part being secured in said recess by friction welding, and the top land part being secured in said recess between the ring carrier part and the piston crown by friction welding.

2. A piston as claimed in claim 1, wherein an annular coolant cavity is formed in the piston between the ring carrier part and the body part.

3. A piston as claimed in claim 2, wherein at least one of the ring carrier part and top land part is made from a material selected from the following, namely, steel, stainless steel, bronze and hypereutectic aluminum-silicon alloy, and wherein the body part is formed from a full solution and precipitation heat-treated alloy selected from the following, namely a magnesium alloy and an aluminum alloy.

4. A piston as claimed in claim 3, wherein the top land part is friction welded to the ring carrier part.

5. A piston as claimed in claim 3, wherein the top land part is formed integrally with the ring carrier part.

6. A piston as claimed in claim 1, including an insert friction welded into the piston crown, said insert being made from a heat-resistant metal selected from the group consisting of an aluminum copper-nickel-maganese alloy, sintered aluminum, a nickel alloy and steel.

7. A piston as claimed in claim 6, wherein said insert comprises at least a part of a combustion bowl and a hot spot element.

8. A piston including two mating parts secured together by friction welding, wherein one of the mating parts comprises a tubular light alloy body part, and the other of said mating parts comprises a crown part of substantially the same diameter as the body part, formed from a thermal-shock-resistant metal, and friction welded to the body part, a recess defining an annular coolant passage being formed between the cooperating mating surface of the body part and crown part.

9. A piston including two mating parts secured together by friction welding, wherein one of the mating parts comprises a tubular light alloy body portion including a sidewall and a pair of gudgeon pin bosses, and the other of said parts comprises a tubular bushing friction welded into each gudgeon pin boss of the piston, the mating surfaces of each bushing and boss being tapered or stepped.